United States Patent [19]

Verber et al.

[11] 4,415,226
[45] Nov. 15, 1983

[54] APPARATUS FOR CONTROLLING LIGHT IN ELECTROOPTIC WAVEGUIDES WITH INDIVIDUALLY ADDRESSABLE ELECTRODES

[75] Inventors: Carl M. Verber, Columbus; Richard P. Kenan, Upper Arlington, both of Ohio

[73] Assignee: Battelle Memorial Institute, Columbus, Ohio

[21] Appl. No.: 221,956

[22] Filed: Dec. 31, 1980

[51] Int. Cl.$^3$ ............................................. G02B 5/172
[52] U.S. Cl. .............................. 350/96.14; 350/96.13; 350/162.13; 364/822
[58] Field of Search ............. 350/96.13, 96.14, 162 R, 350/355, 356, 162.13; 364/822, 827; 340/347 M, 347 AD

[56] References Cited

U.S. PATENT DOCUMENTS 4,340,272 7/1982 Papuchon et al. ................ 350/96.14
4,348,075 9/1982 Gottlieb et al. .................. 350/96.13

OTHER PUBLICATIONS

Sov. J. Quantum Electron., 10(2), Feb. 1980, Belin et al., "Integrated-Optical Switching System", pp. 249–250.

*Primary Examiner*—John D. Lee
*Assistant Examiner*—Frank González
*Attorney, Agent, or Firm*—Philip M. Dunson

[57] ABSTRACT

Apparatus for receiving light entering therein and controlling the directions in which portions of the light travel therethrough. Input means (21) directs portions (22) of the entering light (20) in a predetermined input direction (23) into a processing region (24) in a waveguide (25). Control means (26) temporarily and separately changes the index of refraction in each of a plurality of subregions (27) in the processing region (24), to modulate the light (22) travelling thereto in approximately the predetermined input direction (23) differently from any light travelling thereto in other input directions. Output means (28) receives portions (29) of the light travelling beyond the subregions (27) in at least one selected output direction (30) and responds thereto. Typically each subregion (27A-27H) is such that providing altered indexes of refraction therein can form in the subregion (27A-27H) a Bragg grating positioned with a direction of Bragg incidence approximately in the predetermined input direction (23). The control means (26) typically comprises an electrooptic grating (27A-27H) (having a plurality of interdigital electrodes (32)) in each subregion (27), and means (26A-26H) for applying a potential difference to each grating (27A-27H) separately, and thus providing an electrical field in each subregion (27) at selected times.

The apparatus (FIG. 1) is especially useful and advantageous in character generators (FIG. 3), correlators (FIGS. 4, 5, 9, 10), and the like.

58 Claims, 10 Drawing Figures

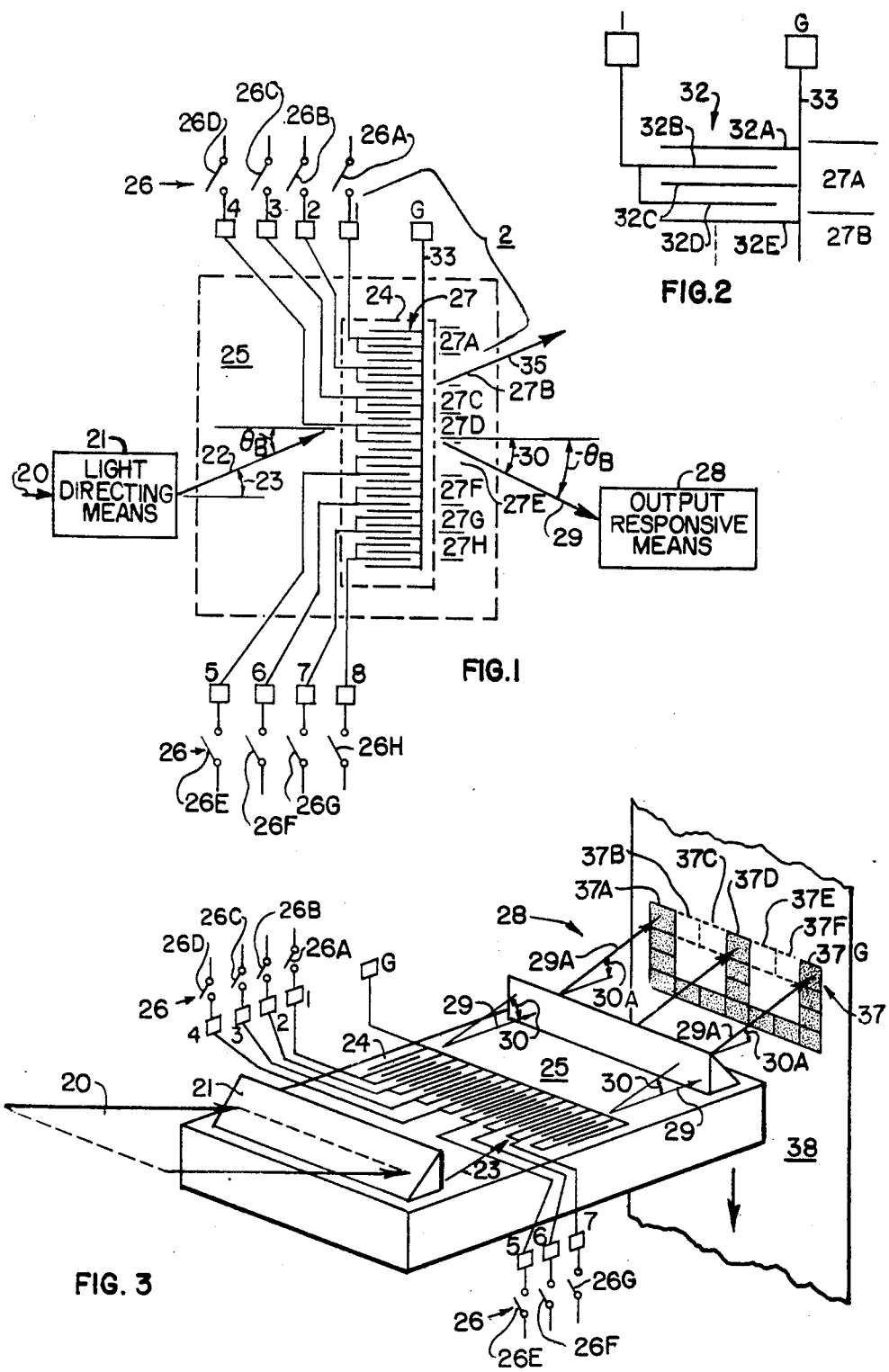

APPARATUS FOR CONTROLLING LIGHT IN ELECTROOPTIC WAVEGUIDES WITH INDIVIDUALLY ADDRESSABLE ELECTRODES

The Government has rights in this invention pursuant to Contract No. F49620-79-C-0044 awarded by Air Force Office of Scientific Research.

FIELD

This invention relates to apparatus for receiving light entering therein and controlling the directions in which portions of the light travel therethrough.

Typical apparatus according to the present invention for receiving light entering therein and controlling the directions in which portions of the light travel therethrough, comprises input means for directing portions of the entering light in a predetermined input direction into a processing region in a waveguide, control means for temporarily and separately changing the index of refraction in each of a plurality of subregions in the processing region, to modulate the light travelling thereto in approximately the predetermined input direction differently from any light travelling thereto in other input directions, and output means for receiving portions of the light travelling beyond the subregions in at least one selected output direction and for responding thereto. Typically each subregion is such that providing altered indexes of refraction therein can form in the subregion a Bragg grating positioned with a direction of Bragg incidence approximately in the predetermined input direction. The control means typically comprises an electrooptic grating (having a plurality of interdigital electrodes) in each subregion, and means for applying a potential difference to each grating separately, and thus providing an electrical field in each subregion at selected times.

The apparatus is especially useful and advantageous in character generators, correlators, and the like.

BACKGROUND

This section comprises a slight revision of our recent paper (with J. R. Busch), cited herein as Reference (10), which introduces some of the concepts and features of the present invention.

The possibility of making an integrated optical correlator was first suggested by Schubert and Harris[1] in 1968. In its simplest form, a correlator consists of two spatial light modulators (SLM), traversed by an optical beam, together with some means of translating the signal modulating one of the SLM's transversely to the beam. The amount of light passing both modulators, integrated over the beam width, then varies with the position of the translating signal according to the correlation of the two modulating signals. We call the SLM with the spatially translating modulation signal the "signal" modulator, and the other SLM, which serves to analyze (or filter) the output of the first SLM the "filter" modulator or simply the "filter". All of the components needed to construct a correlator are available in present-day integrated optics technology with the exception of a conveniently programmable filter modulator. In particular, surface acoustic wave (SAW) transducers are available that have sufficient bandwith and efficiency to serve as a signal modulator; the translation of the input signal is then accomplished by the propagation of the SAW. The first step toward realization of a programmable binary (i.e., two-state) filter is the fabrication and testing of a static filter.

The static binary filter 24A consists of a segmented surface grating[2] operating in the Bragg regime. A broad beam of light 22 incident upon the grating 24A at the Bragg angle is deflected by $2\theta_B$ in the segments in which the grating exists (binary "ones") and is undeflected in the region where the grating is absent (binary "zeros"). The incident beam is thus diffracted into two beams separated by the angle $2\theta_B$. Each beam is amplitude modulated: the diffracted beam according to the pattern of ones and zeros in the segmented grating, at 100% modulation; and the transmitted beam according to the ones complement of this pattern and generally with less than 100% modulation (if the grating segments are less than 100% efficient). The operation of the filter modulator has been investigated in conjunction with a signal grating which is produced by a surface acoustic wave (SAW) transducer driven by a digitally-modulated r.f. signal, thus forming a correlator. The gratings are designed such that the presence of a "one" in both the signal and reference plane results in the deflection of one bit's worth of light into the detector. Any other combination will result in no light at the detector. The correlation signal appears at the detector as the digital SAW pattern moves past the stationary filter pattern.

As shown in FIG. 10, the filter is composed of a permanent photo-resist surface grating 24A on a Ti-infused $LiNbO_3$ waveguide 25. It is formed by first exposing the resist to the interference pattern formed by two 4880 Å laser beams and then further exposing the resist through a bit mask before development. The signal is a pulse modulated 270 MHz surface acoustic wave 21. The pulse duration of 114 nsec is chosen to match the 400 µm segment length of the permanent filter 24A. The autocorrelation response of the filter to the 17-bit word 10001001011101101 agreed approximately with the expected autocorrelation signal. (Similarly to FIGS. 7 and 8.)

To generate the above pattern, a 400 µm segment length was used. This requires a 6.8 mm-wide light beam to illuminate a 17-bit word. To increase the word length without increasing the beam width requires a decrease in segment length. Without modifying the available equipment, we showed that 200 µm segment lengths can be used with no decrease in efficiency. Problems in maintaining a square r.f. pulse prevented us from attaining our goal of 100 µm segment lengths.

In the present experiment the filter and the signal grating periods were $\Lambda_f = 6.8$ µm and $\Lambda_s = 13.3$ µm, respectively. The different grating periods were used so that only doubly-diffracted light would enter the detector. This results in good signal discrimination even if the gratings do not have very high diffraction efficiency. However, this type of correlator has a serious flaw. If the signal and filter patterns are identical, the output is maximum, as desired. But, adding additional "1"s (i.e., additional grating segments) to the signal grating will not decrease the correlation maximum. This situation arises because "0"s are, in essence, ignored in forming the correlation, that is, no weight is given to correct occurrence of a "0" in each grating. There are a number of ways to correct this problem, all of which involve some sacrifice of signal discrimination unless high (near unity) diffraction efficiencies are achieved. The simplest solution is to redefine the coding for the second grating so that a "1" corresponds to the absence of a grating segment and a "0" corresponds to the presence of a grating segment. Then, the singly-diffracted beams are detected. If the gratings have the same period, then singly-diffracted (0-0 and 1-1 coincidences) light passes in one direction, while undiffracted and doubly-diffracted light passes in a direction $2\theta_B$ away. Now excess "1"s in the signal do cause a decrease in correlation signal. Furthermore, if both beams are detected, they can be subtracted to effect a penalty for 0-1 and 1-0 coincidences. The loss in signal discrimination mentioned above occurs when the diffracted efficiencies of the gratings segments are low enough to allow significant zero-order energy to be transmitted through a grating segment that should be diffracting all of the light incident upon it into the first-order direction.

Having demonstrated that the digital integrated optical filter is a realizable device, it is reasonable to consider how a programmable filter could be constructed. One of the criteria for the programmable device is that it should operate on voltages low enough to be compatible with semiconductor logic. This can be achieved in the manner of the large-angle optical waveguide switch first implemented by Verber et al[3] and reported on in a later version by Kotani et al.[4] These devices use the small deflection of a low-voltage electrooptic deflector to bring a light beam into Bragg incidence on a fixed phase grating. The fixed grating then imparts the required larger angular change. A programmable filter using this effect could consist of a row of N-shaped electrooptic deflectors[5] followed by a single permanent grating which extends across the entire width of the beam. Energizing a single deflector would bring a segment of the light beam into Bragg incidence upon the fixed grating which would then impart the required larger deflection. The set of "one" beams and the set of "zero" beams thus generated could then be used in the type of correlator already discussed. Alternatively, a larger Bragg angle could be used to further separate the two sets of beams and the "one" beams could be used as the input to a Fourier transform correlator of the type suggested in Reference (1).

An alternative approach to the implementation of a programmable spatial filter is to use a series of individually controlled electrooptic gratings[6] as shown in FIG. 1. This approach is superior to the use of N-shaped deflectors in that a fixed grating is not required to achieve suitably large deflections. In addition, optical losses due to fringing effects are expected to be smaller in this case than for the N-shaped deflectors. In the design shown in FIG. 4, one of the gratings is an acoustooptic one, as in the present experiments, while the other is the segmented electrooptic grating that can be addressed electrically for programming. The electrooptic grating is designed to have the same period as the acoustic grating so that the ones-complement coding can be used for one of the gratings as discussed above.

Typical apparatus according to the present invention for receiving light entering therein and controlling the directions in which portions of the light travel therethrough, comprises input means for directing portions of the entering light in a predetermined input direction into a processing region in a waveguide, control means for temporarily and separately changing the index of refraction in each of a plurality of subregions in the processing region, to modulate the light travelling thereto in approximately the predetermined input direction differently from any light travelling thereto in order input directions, and output means for receiving portions of the light travelling beyond the subregions in at least one selected output direction and for responding thereto. Typically each subregion is such that providing altered indexes of refraction therein can form in the subregion a Bragg grating positioned with a direction of Bragg incidence approximately in the predetermined input direction. The control means typically comprises an electrooptic grating (having a plurality of interdigital electrodes) in each subregion, and means for applying a potential difference to each grating separately, and thus providing an electrical field in each subregion at selected times.

Typically, successive subregions are in close proximity and all of the digits in all of the electrodes therein are parallel. An electrode in each subregion typically is connected to an electrode in each adjacent subregion, typically with alternate digits throughout the processing region connected together to form one common electrode shared by all subregions. Typically the other digits in each subregion are connected together to form another electrode for that subregion only, and are insulated from all other electrodes.

Typically the input means comprises means for directing light of known or controlled intensity approximately in the predetermined input direction into the processing region, the control means comprises means for applying a separate potential difference to the electrodes of each subregion, and the output means comprises means responsive to light travelling beyond each subregion in at least one selected output direction for providing a separate indication substantially simultaneously with the indications for the other subregions.

Where the control means comprises means responsive to digital information, the output means typically comprises means for providing selectively either a first indication or a second indication in each of a plurality of indicators. Typically each indicator comprises a separate area in a tangible medium, the first indication comprises a first condition provided in an area by the output means, and the second indication comprises a second condition either provided by the output means or comprising a preexisting condition permitted to continue by the absence of any action on the area by the output means. Typically the output means, selectively for each separate area, either provides a predetermined mark therein or permits the area to remain free of such a mark. Typically the output means, selectively for each separate area, either changes a chemical, electrical, or magnetic property therein or permits the property to remain in a preexisting state. For example, it may either substantially remove an existing electrical charge therein or permit the charge to remain substantially undiminished.

Where the control means comprises means responsive to analog information, the output means typically comprises means for providing selectively, in each of a plurality of indicators, an indication responsive to a quantity that is a function of the analog information. Typically each indicator comprises a separate area in a tangible medium, and the output means affects a condition therein. Typically the output means, selectively for each separate area, determines the magnitude of a condition therein, such as by providing a controlled value of a light responsive property therein. Typically the output determines the visible shade of each area. Typically the output means determines the magnitude of a chemical, electrical, or magnetic property in each area.

For example, it may determine the polarity and magnitude of any electrical charge in each area.

Typically a selected output direction is approximately twice the Bragg angle away from the predetermined input direction. Another typical selected output direction is approximately the same as the predetermined input direction. So, commonly a first selected output direction is approximately twice the Bragg angle away from the predetermined input direction and a second selected output direction is approximately the same as the predetermined input direction. Typically the input means comprises means for directing portions of the entering light to the processing region in directions related to their respective directions of entry into the apparatus.

In typical apparatus according to the invention, the output means comprises means for selectively either permitting light travelling in a selected output direction to continue in approximately the same direction or causing it to travel further in the other selected output direction. Typically the output responsive means comprises output control means for providing selectively and separately in each of a plurality of output responsive subregions; each receiving light travelling from each subregion, respectively, of the processing region; a change in the index of refraction, to modulate the light travelling thereto in approximately the first selected output direction in a first manner, and to modulate the light travelling thereto in approximately the second selected output direction in a second manner. Typically each output responsive subregion is such that providing altered indexes of refraction therein can form in the subregion a Bragg grating positioned with a first direction of Bragg incidence approximately in the first selected output direction and with a second direction of Bragg incidence approximately in the second selected output direction; and the output control means typically comprises means for providing an electric field in each output responsive subregion at selected times.

Typical output control means comprises a surface acoustic wave transducer and means for providing alternating electrical energy to the transducer. Other typical output control means comprises a plurality of electrooptic gratings and means for applying a potential difference to each grating separately.

Typically the processing subregion control means comprises means responsive to an ordered first set of separate electrical signals, the output subregion control means comprises means responsive to an ordered second set of separate electrical signals, and the output responsive means comprises also means responsive to light travelling beyond the output responsive subregions to provide an output signal that is responsive to the degree of similarity between the first and second sets of electrical signals; and the output responsive means comprises means for providing a discernible indication when the first and second sets of electrical signals are identical in all relevant properties. Typically the electrical signals are provided responsive to digital information and the discernible indication is provided by the output responsive means when the digital information represented by the first set of electrical signals is identical to the digital information represented by the second set of electrical signals.

In other typical apparatus according to the present invention, the input means comprises means for controlling separately at a predetermined or detectable instant the input direction in which a major portion of the entering light is travelling when it reaches each subregion, and the input direction controlling means typically comprises means for directing portions of the light entering the apparatus in a predetermined direction, selectively, in an input direction that is either the same as the entering direction or a different direction, one of the selectable directions being the predetermined input direction. Typical input direction controlling means comprises a surface acoustic wave transducer and means for providing alternating electrical energy to the transducer. Other typical input direction controlling means comprises a plurality of electrooptic gratings and means for applying a potential difference to each grating separately. The input direction controlling means typically comprises means for directing a major portion of the entering light selectively either in the predetermined input direction or in a different input direction.

Typically the control means is separately responsive to light in first and second predetermined input directions, and to other input directions, and the input direction controlling means comprises means for directing a major portion of the entering light selectively either in a first predetermined input direction, in a second predetermined input direction, or in a different input direction. Advantageously the first and second input directions and the subregions are so arranged that when a Bragg grating is formed in a subregion it has a first direction of Bragg incidence approximately in the first input direction and a second direction of Bragg incidence in the second input direction. Typically the input direction controlling means comprises first and second surface acoustic wave transducers and means for providing alternating electrical energy to each transducer in reponse to binary information, where a binary "zero" causes the energy to be directed to the first transducer and a binary "one" causes the energy to be directed to the second transducer.

Typically the input direction controlling means comprises means responsive to an ordered first set of separate electrical signals, the subregion control means comprises means responsive to an ordered second set of separate electrical signals, and the output responsive means comprises means responsive to an output signal that is responsive to the degree of similarity between the first and second sets of electrical signals; and the output responsive means comprises means for providing a discernible indication when the first and second sets of electrical signals are identical in all relevant properties. Typically the electrical signals are provided responsive to digital information and the discernible indication is provided by the output responsive means when the digital information represented by the first set of electrical signals is identical to the digital information represented by the second set of electrical signals.

DRAWINGS

FIG. 1 is a schematic diagram showing typical apparatus according to the present invention.

FIG. 2 is an enlarged view of a portion of FIG. 1, labelled 2 therein, to call out details thereof.

FIG. 3 is a perspective and schematic view of a typical embodiment of the invention useful for character generation and the like.

FIG. 4 is a schematic view of a typical embodiment of the invention useful for correlation and the like.

CARRYING OUT THE INVENTION

Figure 4:
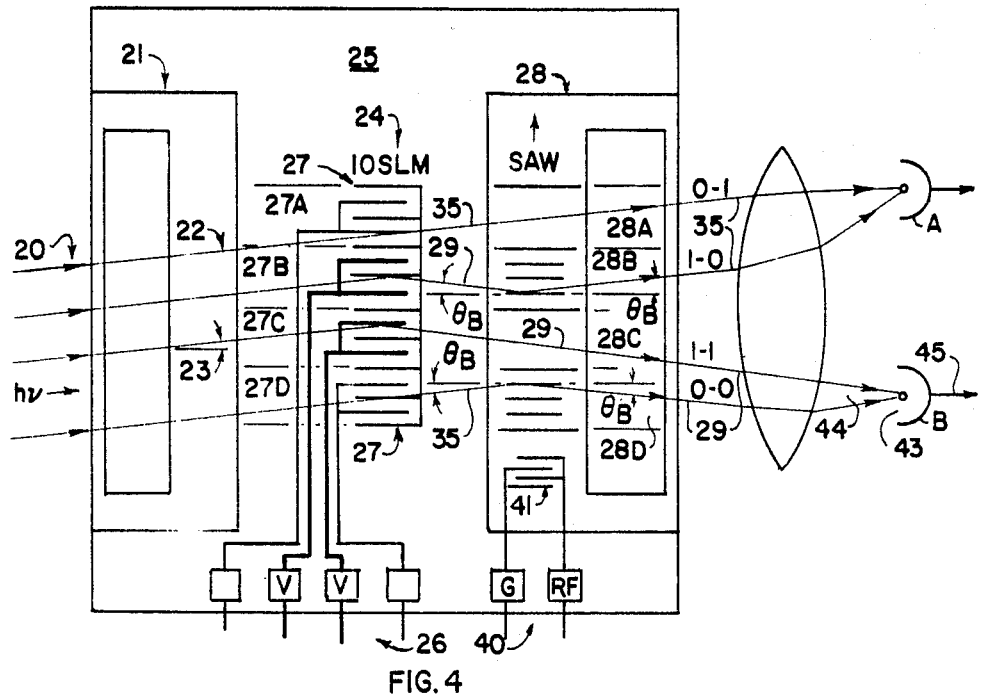

Referring now to FIG. 1, typical apparatus according to the present invention for receiving light 20 entering therein and controlling the directions in which portions of the light travel therethrough, comprises input means 21 for directing portions 22 of the entering light 20 in a predetermined input direction 23 into a processing region 24 in a waveguide 25, control means 26 for temporarily and separately changing the index of refraction in each of a plurality of subregions 27 in the processing region 24, to modulate the light 22 travelling thereto in approximately the predetermined input direction 23 differently from any light travelling thereto in order input directions, and output means 28 for receiving portions 29 of the light travelling beyond the subregions 27 in at least one selected output direction 30 and for responding thereto. Typically each subregion 27A-27H is such that providing altered indexes of refraction therein can form in the subregion 27A-27H a Bragg grating positioned with a direction of Bragg incidence approximately in the predetermined input direction 23. Typically the control means 26 comprises means 26A-26H,32 for providing an electrical field in each subregion 27A-27H at selected times. The control means 26 typically comprises an electrooptic grating 27A-27H in each subregion 27 and means 26A-26H for applying a potential difference to each grating 27A-27H separately. Typically each electric-field-providing means 26A-26H,32 comprises a plurality of interdigital electrodes 32A,32B, etc. (FIG. 2).

Typically, successive subregions 27A-27B, 27B-27C, etc. are in close proximity and all of the digits 32A,32B, etc. in all of the electrodes 32A,32B,32C, etc. therein are parallel. An electrode 32A,32C, etc. in each subregion 27A,27B, etc. typically is connected to an electrode 32E, etc. in each adjacent subregion, typically with alternate digits 32A,32C,32E, etc. throughout the processing region 24 connected together to form one common electrode 33 shared by all subregions 27 (and typically grounded, as indicated at G). Typically the other digits 32B,32D, etc. in each subregion 27A, etc. are connected together to form another electrode for that subregion only, and are insulated from all other electrodes 32A,32C,32E, etc.

Typically the input means 21 comprises means for directing light 20 of known or controlled intensity approximately in the predetermined input direction 23 into the processing region 24, the control means 26 comprises means 26A,26B, etc., for applying a separate potential difference to the electrodes 32A-32C, 32B-32D, etc. of each subregion 27A, etc., and the output means 28 comprises means responsive to light 29 travelling beyond each subregion 27A,27B, etc. in at least one selected output direction 30 for providing a separate indication substantially simultaneously with the indications for the other subregions 27.

Referring now to FIG. 3, where the control means 26,27 comprises means responsive to digital information, the output means 28 typically comprises means for providing selectively either a first indication, as at 37A,37D, and 37G, or a second indication as at 37B,37C,37E, and 37F, in each of a plurality of indicators 37. Typically each indicator 37 comprises a separate area 37A,37B, etc. in a tangible medium 38, and the first indication 37A,37D,37G comprises a first condition provided in an area 37 by the output means 28, and the second indication comprises a second condition either provided by the output means 28 or comprising a preexisting condition permitted to continue by the absence of any action on the area by the output means 28. Typically the output means 28, selectively for each separate area 37, either provides a predetermined mark therein, as in the areas 37A,37D, and 37G, or permits the area to remain free of such a mark, as in the areas 37B,37C, 37E, and 37F. Typically the output means 28, selectively for each separate area 37, either changes a chemical, electrical, or magnetic property therein or permits the property to remain in a preexisting state, as in various chemical photographic systems, electrophotographic systems, computer memories, character generators, etc. For example, it may either substantially remove an existing electrical charge therein or permit the charge to remain substantially undiminished, as in typical electrophotographic systems, copiers, etc.

Where the control means 26 is responsive to analog information, the output means 28 typically provides selectively, in each of a plurality of indicators 37, an indication responsive to a quantity that is a function of the analog information. Typically each indicator 37 comprises a separate area 37A,37B, etc. in a tangible medium 38, and the output means 28 affects the magnitude of a condition therein, selectively for each separate area; such as by providing a controlled value of a light responsive property therein. Typically the output determines the visible shade of each area 37A,37B, etc., as in FIG. 3, or the magnitude of a chemical, electrical, or magnetic property therein. For example, it may determine the polarity and magnitude of any electrical charge in each area, as in electrophotographic reproduction, copying, etc.

Typically a selected output direction 30 is approximately twice the Bragg angle $\theta B$ away from the predetermined input direction 22. Another typical selected output direction 35 is approximately the same as the predetermined input direction 22. So, commonly a first selected output direction 30 is approximately twice the Bragg angle $\theta B$ away from the predetermined input direction 22 and a second selected output direction 35 is approximately the same as the predetermined input direction 22. Typically the input means 21 comprises means for directing portions of the entering light 20 to the processing region 24 in directions (22 or others) related to their respective directions (20 or others) of entry into the apparatus.

Figure 5:
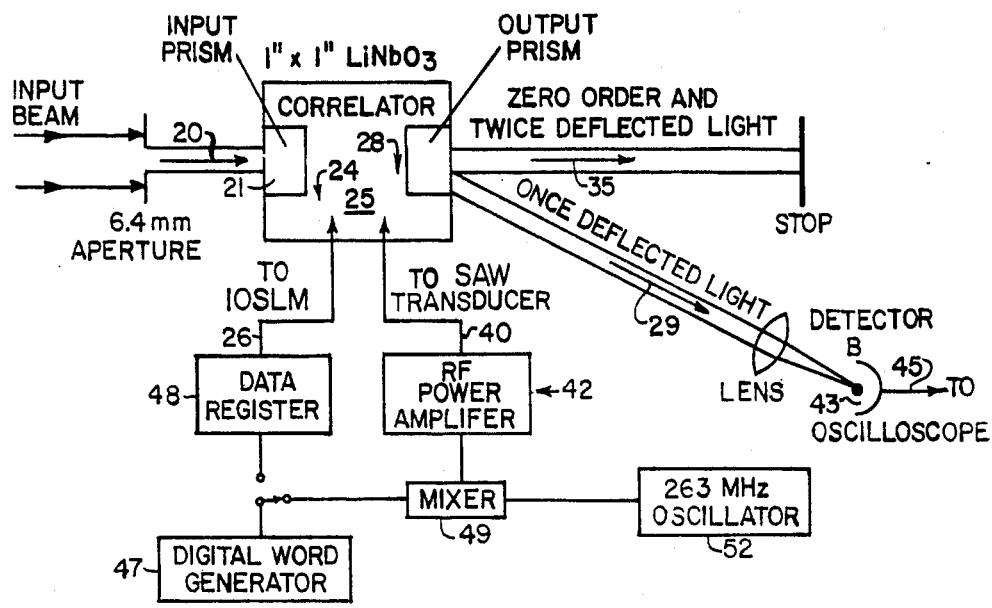
FIG. 5 is a block diagram of typical apparatus according to the invention comprising a correlator as in FIG. 4.

In typical apparatus according to the invention, such as the apparatus shown in FIGS. 4 and 5, the output means 28 comprises means for selectively either permitting light travelling in a selected output direction 29,35 to continue in approximately the same direction 29,35 or causing it to travel further in the other selected output direction 35,29. Typically the output responsive means 28 comprises output control means for providing selectively and separately in each of a plurality of output responsive subregions 28A,28B,28C,28D; each receiving light travelling from each subregion 27A,27B,27C,27D, respectively, of the processing region 24; a change in the index of refraction, to modulate the light travelling thereto in approximately the first selected output direction 29 in a first manner as shown at 28B, and to modulate the light travelling thereto in approximately the second selected output direction 35 in a second manner, as shown at 28D. Typically each output responsive subregion 28A, etc. is such that providing altered indexes of refraction therein can form in the subregion a Bragg grating, as shown in the subregions 28B and 28D, positioned with a first direction of Bragg incidence approximately in the first selected output direction 29, as shown in the subregion 28B, and with a second direction of Bragg incidence approximately in the second selected output direction 35, as shown in the subregion 28D; and the output control means 28 typically comprises means 40 for providing an electric field in each output responsive subregion 28 at selected times.

Typical output control means 28 comprises a surface acoustic wave transducer 41 and means 40,42 for providing alternating electrical energy to the transducer 41. Other typical output control means 28 may comprise a plurality of electrooptic gratings 27 and means 26 for applying a potential difference to each grating 27A, etc. separately, as by replacing the transducer 41 in FIG. 4 with another processing region 24 located with subregions 28A, etc. positioned as shown in FIG. 4.

Figure 7:
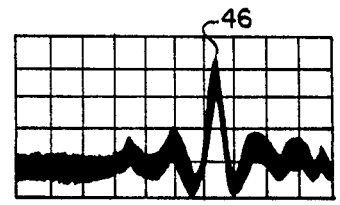
FIG. 7 is a copy of an oscillograph showing the autocorrelation profile for the 32-bit word 11001111000011111100000011111111 as generated by a correlator, as in FIGS. 4 and 5.
Figure 8:
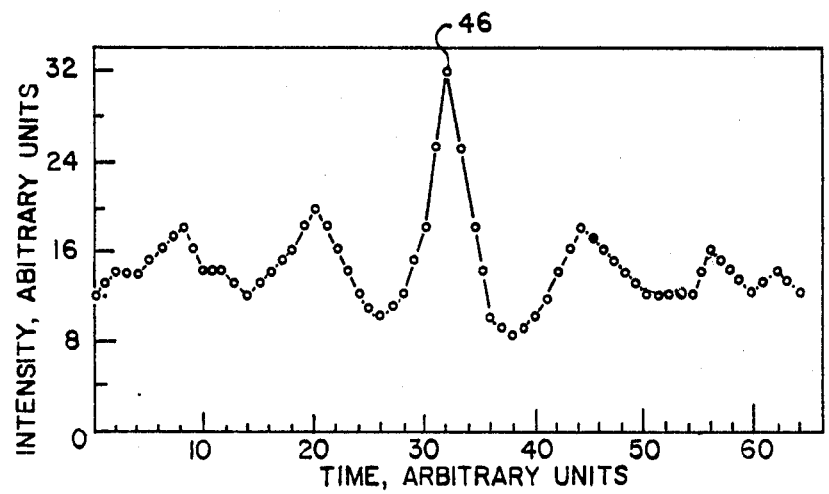
FIG. 8 is a graph showing the same autocorrelation profile as calculated.

Typically the processing subregion control means 26 comprises means responsive to an ordered first set of separate electrical signals, the output subregion control means 40 comprises means responsive to an ordered second set of separate electrical signals, and the output responsive means 28 comprises also means 43 responsive to light 44 travelling beyond the output responsive subregions 28A, etc. to provide an output signal at 45 that is responsive to the degree of similarity between the first and second sets of electrical signals; and the output responsive means 28 comprises means for providing a discernible indication, as at 46 in FIGS. 7 and 8, when the first and second sets of electrical signals are identical in all relevant properties. Typically the electrical signals are provided responsive to digital information, as at 47 in FIG. 5, and the discernible indication 46 is provided by the output responsive means 43 when the digital information represented by the first set of electrical signals is identical to the digital information represented by the second set of electrical signals, as in FIG. 5.

Figure 9:
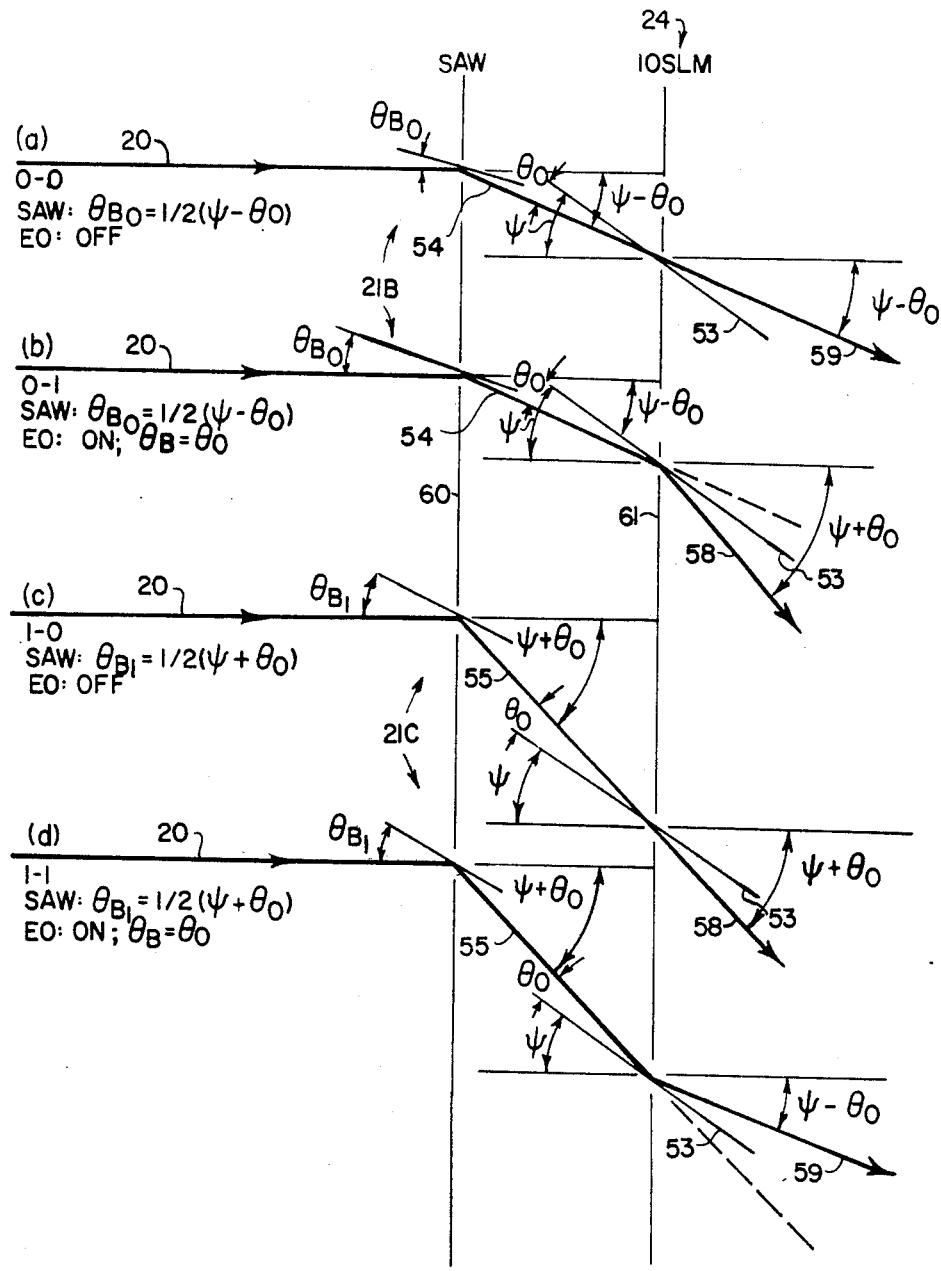
FIG. 9 is a schematic drawing showing typical geometric relationships for a correlator as in FIGS. 4 and 5, but with components arranged to improve the output signal to noise ratio.
Figure 10:
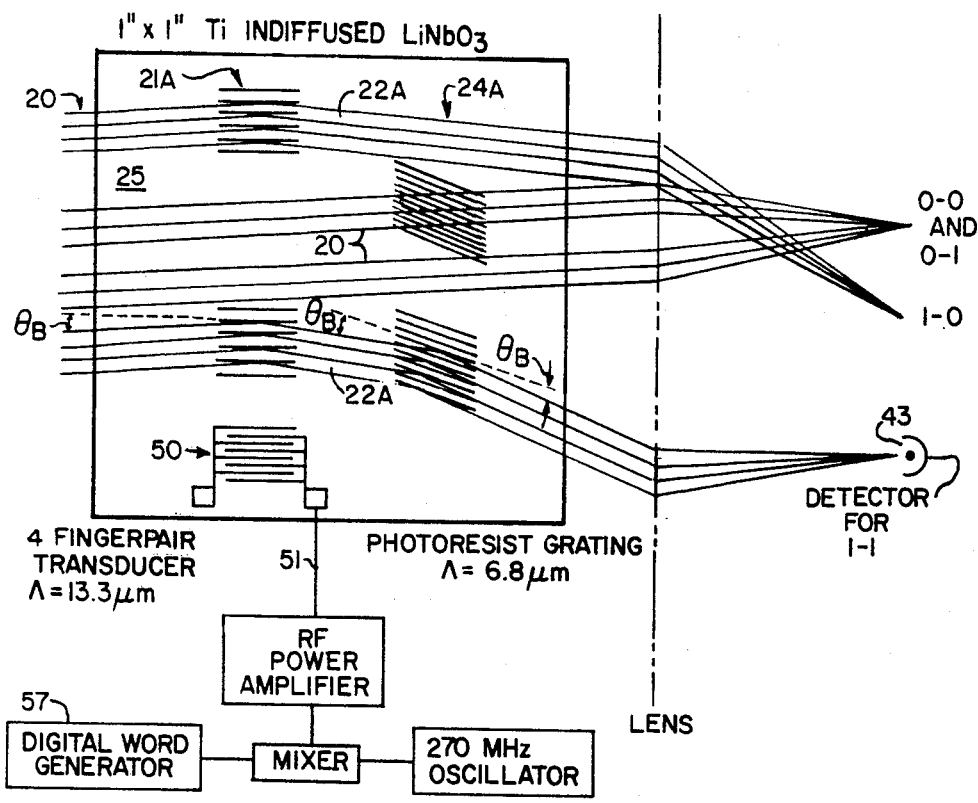
FIG. 10 is a schematic view of another embodiment as in FIGS. 4 and 5, but with one grating shown as being in a permanent form to illustrate experiments performed in the development of the present invention.

In other typical apparatus according to the present invention, such as that of FIGS. 9 and 10, the input means 21A(21B) comprises means for controlling separately at a predetermined or detectable instant the input direction in which a major portion of the entering light 20 is travelling when it reaches each subregion 27, and the input direction controlling means 21A typically comprises means for directing portions of the light entering the apparatus in a predetermined direction 20, selectively, in an input direction that is either the same as the entering direction 20 or a different direction 22A, one of the selectable directions being the predetermined input direction 22A. Typical input direction controlling means 21A comprises a surface acoustic wave transducer 50 and means 51 for providing alternating electrical energy to the transducer 50. Other typical input direction controlling means 21A may comprise a plurality of electrooptic gratings 27A,27B, etc. (as in FIG. 1) and means 26 for applying a potential difference to each grating 27A, etc. separately. The input direction controlling means 21A typically comprises means for directing a major portion of the entering light 20 selectively either in the predetermined input direction 22A or in a different input direction, such as the entering direction 20.

As in apparatus arranged according to FIG. 9, typically the control means 26,27 is separately responsive to light in first and second predetermined input directions 54,55, and to other input directions, and the input direction controlling means 21B,21C comprises means for directing a major portion of the entering light selectively either in a first predetermined input direction 54, in a second predetermined input direction 55, or in a different input direction. Advantageously the first and second input directions 54,55 and the subregions 27A,27B, etc. are so arranged that when a Bragg grating is formed in a subregion 27A, etc. it has a first direction of Bragg incidence approximately in the first input direction 54 and a second direction of Bragg incidence in the second input direction 55. Typically the input direction controlling means 21B,21C comprises first and second surface acoustic wave transducers (such as 50 in FIG. 10) and means (51) for providing alternating electrical energy to each transducer (50) in response to binary information, where a binary "zero" causes the energy to be directed to the first transducer (in 21B) and a binary "one" causes the energy to be directed to the second transducer (in 21C). Preferably the first and second predetermined input directions 54,55 and the output directions 58,59 from the Bragg grating formed in each subregion 27A,27B, etc. are all different from the direction 20 in which light enters the apparatus.

Typically the input direction controlling means (51)21B,21C comprises means (51) responsive to an ordered first set of separate electrical signals, the subregion control means 26 comprises means responsive to an ordered second set of separate electrical signals, and the output responsive means 28 comprises means responsive to an output signal that is responsive to the degree of similarity between the first and second sets of electrical signals; and the output responsive means 28 comprises means for providing a discernible indication, as at 46 in FIGS. 7 and 8, when the first and second sets of electrical signals are identical in all relevant properties. Typically the electrical signals are provided responsive to digital information, as at 57 in FIG. 10, and the discernible indication 46 is provided by the output responsive means 43 when the digital information represented by the first set of electrical signals is identical to the digital information represented by the second set of electrical signals.

We have fabricated an integrated optical spatial light modulator (IOSLM) which consists of an electrooptic (E-O) grating[9] structure addressable in 32 separate segments. It has been successfully used as a component in a 32 bit, 17.5 MBit/sec digital correlator.

The basic IOSLM structure 24 is shown in FIG. 1. A broad optical guided wave 22 which passes under the device is divided into two beams which propagate in directions $\theta_B$ and $-\theta_B$ (35 and 29), respectively. The beams 35,29 have complementary transverse amplitude modulations which are determined by the voltages applied via the switches 26A-26H to the IOSLM electrodes 32A,32B, etc.

The structure used for the correlator consists of 32 segments, each containing 15 finger pairs. The electrooptic grating period is 13.33 μm, so each segment is 200 μm wide and $\theta_B = 0.62°$ for 0.628 μm light in LiNbO$_3$:Ti waveguide. A diffraction efficiency of 95% was achieved at an applied voltage of 9.5 volts when the electrodes were applied over a 1000 Å sputtered-glass buffer layer. Lower voltages are sufficient for thinner glass layers; and for no glass at all, maximum diffraction efficiency is reached at 4 volts.

The correlator consists of the IOSLM and a 4-finger-pair SAW transducer of the same period mounted on the same substrate. The SAW is digitally modulated so that the SAW and E-O bit lengths are identical. Various correlator configurations are possible. A typical one, as shown in FIG. 4, uses a ones-complement notation. That is, a one is designated by the presence of an E-O grating or the absence of a surface acoustic wave (SAW) grating. The (0-0) and (1-1) coincidences are then both singly diffracted and proceed in the $-\theta_B$ direction 29, while the (0-1) and (1-0) anticoincidences both proceed in the $+\theta_B$ direction 35. Discrimination between the programmed filter word and a series of random words has been demonstrated.

The number of resolution elements in the IOSLM can easily be increased to at least 64. The number will ultimately be limited by the area required for the electrical connections. The size of a resolution element can be reduced to 40 μm without significant loss of diffraction efficiency, so spatial frequencies of up to 12 line pairs per millimeter are feasible. Since the IOSLM can be used either in a digital or in an analog mode it could be used as an element for introducing either data or filter functions into an integrated optical Fourier-transform processor.

APPLICABILITY

A programmable integrated optical spatial light modulator (IOSLM) with sufficiently high performance characteristics would have the potential for forming the basis of a variety of integrated optical circuits for signal and data processing. For true utility the IOSLM should not only be easily and rapidly programmable, but should have high spatial resolution and should be capable of analog or binary operation. We report here the characteristics of an electrooptic IOSLM that demonstrates most of these desirable characteristics. The device consists of a number of adjacent but individually addressable interdigital electrode sets which, via the Bragg effect, deflect discrete portions of an incident guided wave proportionally to the voltages applied to the separate grating segments.

The IOSLM consists of an array of interdigital electrode sets fabricated on a thin buffer layer on the surface of a planar electrooptic waveguide as shown schematically in FIGS. 1-4. FIG. 4 is a schematic drawing of an integrated optical correlator based on the programmable IOSLM. The IOSLM is the array 27 in the center of the drawing. The notations (0-1, 1-0; etc.) on the output beams 29,35 indicate the state of the IOSLM and SAW segments, respectively, that are encountered by the respective beams 22;29,35. The buffer layer serves to isolate the electrodes from the waveguide so that the guided wave is affected only by the applied electric fields and not by the presence of the metallization pattern. The tangential component of the electric field in the waveguide is the only field effective in altering the refractive index for the arrangement shown: TE mode light propagating in the x direction in a Y-cut crystal of LiNbO$_3$. This field has been derived by Engan.[7] The fundamental component is given by $$E_z = (0.847)\left(\frac{V_o}{g}\right)\cos\frac{\pi z}{2g}, \quad (1)$$

where g is the electrode gap width and z is the distance from the gap center. In the Bragg regime, only this component is effective. In the electrooptic (E-O) waveguide, this field results in an index-of-refraction modulation $$\Delta n = -\tfrac{1}{2} n_{eff}^3 rE \quad (2)$$

The index of refraction $n_{eff}$ is the effective index of guided mode and r is the appropriate electrooptic coefficient. Since the electric field and the index modulation fall exponentially it is desirable to use a waveguide which confines the light closely to the waveguide surface. On a LiNbO$_3$ substrate, a Ti-infused guide is therefore preferable to an out-diffused guide.

If we ignore the fall-off of the field in the y-direction, we can treat the periodic index variation as a simple thick Bragg grating, the Bragg angle $\theta_B$ being given by $$\sin\theta_B = \lambda_o/2n_{eff}\Lambda \quad (3)$$

and the diffraction efficiency by[8]

$$\eta = \sin^2\frac{\pi \Delta n d}{\lambda_o \cos\theta_B} \quad (4)$$

where $\Lambda$ is the wavelength of the electrooptic grating and $\lambda_o$ is the vacuum wavelength of the light.

Figure 6:
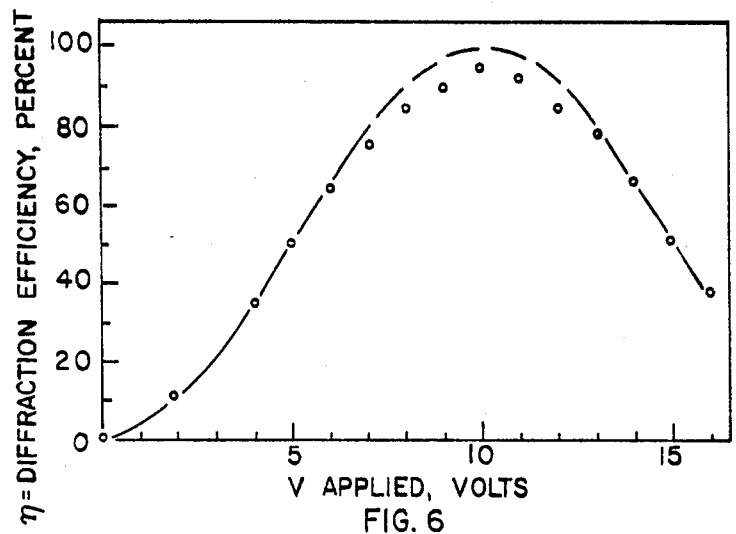
FIG. 6 is a graph of the measured diffraction efficiency of a grating array as in FIG. 4, as a function of the applied voltage. Experimental data are indicated by the circles and the curve is a fit to the form of Equation (4).

The electrooptic gratings used in this work have a wavelength $\Lambda = 13.33$ μm and a corresponding Bragg angle of 0.62° for 0.633 μm He-Ne laser light in the LiNbO$_3$ waveguide. The depth d of the gratings is 2.86 mm. They are defined by standard photolithographic procedures on a 1500 Å-thick buffer layer of Corning 7059 glass which is sputtered onto the surface of a Ti-infused LiNbO$_3$ waveguide which is then annealed at 650° C. for 15 minutes in flowing Argon. In FIG. 6 we show the diffraction efficiency of such a grating as a function of applied field. The maximum efficiency is seen to be 95%.

The maximum diffraction efficiency occurs at an applied voltage of 10 volts. This value is close to the value of 9 volts observed by Hammer and Phillips[9] in a LiNb$_x$Ta$_{1-x}$O$_3$ waveguide with properties similar to ours, using a similar electrode structure and geometry. The fact that the efficiency does not reach 100% can be attributed to the failure to reach the Bragg regime fully. The geometric factor here is $$Q = \frac{2\pi \lambda_o d}{\mu \Lambda^2} = 29. \quad (5)$$

Usually values of Q>8 indicate operation in the Bragg regime. However, a ray impinging on the grating at the Bragg angle of 0.62° actually traverses only 2 or 3 periods of the grating, so we are not fully in a multiple-scattering regime. In fact, weak Raman-Nath peaks are observed, in support of the argument given here.

The IOSLM consists of N identical units such as that pictured in FIG. 1, having a common ground electrode and separately addressable interdigitated electrodes. The structure divides a single broad beam incident at the Bragg angle into two angularly separated beams with complementary transverse amplitude modulation.

The correlator based upon the IOSLM is shown schematically in FIG. 4. Light 20,22 is incident from the left upon the electrooptic structure 27 and those segments of the incident beam 22 which encounter a "one" (i.e., an energized grating 27B,27C) are deflected through $2\theta_B$. The deflected beam therefore consists of a series of bright bands 29 (ones) and dark bands 35 (zeros). This beam 29,35 which is now encoded with the filter word is incident upon a surface acoustic wave (SAW) interaction region 28, again at the Bragg angle $\theta_B$ which in the present experiment is the same for both the SAW and the IOSLM. Propagating through the interaction region is a SAW which is amplitude modulated with a binary data pattern from the digital word generator 47. Beam segments which encounter either no gratings (27A,28A) or two gratings (27B,28B) exit the SAW region in the original input direction 22,35, while beams which encounter only one of the gratings (27C,28D) are deflected by $2\theta_B$. Since any part of the original beam 20 which is undeflected due to gratings of less than perfect diffraction efficiencies will enter detector A, it is preferable for the sake of noise reduction, to take the correlation output at detector B (43). In this case, a ones-complement encoding is used for SAW. That is, if the presence of an active grating represents a one in the IOSLM, then the absence of the SAW in a given region is taken to represent a one.

The correlator was fabricated on a Ti-infused waveguide 25 on a LiNbO$_3$ substrate. Each bit in the IOSLM consists of 15 finger pairs with a period of 13.33 $\mu$m, so that each bit is represented by a 200 $\mu$m-wide window. The SAW is generated by a 4-finger-pair transducer with the same period and finger length as in the IOSLM. The SAW frequency is 263 MHz corresponding to the center frequency of the transducer and the bit duration is 57 n sec so at a SAW velocity of $3.5 \times 10^5$ cm/sec the lengths of the SAW "bits" and IOSLM windows are matched. The data rate could easily be increased several fold, but the speed of the device will ultimately be limited either by the SAW bandwidth or by the necessity to exceed some minimum window dimension in the IOSLM. The limiting data rate is not yet known.

The correlator was exercised using the arrangement shown in FIG. 5. A preselected filter word was loaded into the IOSLM from the digital word generator 47 via a data register 48 which performs a 32 bit serial-to-parallel conversion. After loading the filter word, the word generator 47 was then used to generate the 17.5 M bit/sec modulation signal via the mixer 49, the oscillator 52, and the RF power amplifier 42, to the transducer 41 for the SAW. The autocorrelation signal 45 at the detector B for the 32-bit word is shown in FIG. 7. The calculated autocorrelation is shown in FIG. 8. Note the asymmetry in both curves, produced by the presence of a signal from the IOSLM in the absence of a SAW signal.

The main sources of error in the correlator design discussed above are imperfect diffraction in both the SAW and the electrooptic grating and the presence of a background of diffracted light from the electrooptic grating even in the absence of a SAW signal. The latter source of error is the most serious and is responsible for the asymmetry in the autocorrelation shown in FIGS. 7 and 8. FIG. 9 shows an improved design that eliminates the background diffraction and reduces the impact of less than 100% diffraction efficiency in the SAW. This design resulted from attempting to satisfy two major criteria:

(1) The output signal should be zero when the SAW and the E-O gratings do not overlap in the light path.

(2) The output directions should be well separated angularly from the incident direction and from any spurious diffraction like Raman-Nath regime diffracted beams. The first requirement implies that the E-O (stationary) grating must be ineffective when illuminated by the incident light beam with no SAW present. It also implies that we cannot use the absence of a SAW segment in the coding scheme, since then the E-O grating would have to respond directly to the incident beam.

The second requirement implies that the E-O grating segments must be slanted relative to the direction of the input light, to avoid Raman-Nath beams in the output.

FIG. 9 shows the geometrical relationships for the improved correlator design. The IOSLM grating fingers 53 are now tilted by the angle $\psi$. The left vertical line 60 represents the SAW and the right one 61 represents the IOSLM. Two frequencies are not required for the SAW.

Since we cannot encode a zero in the SAW stream by the absence of a grating, we will need to interleave two SAW streams, one for "zero" bits, with period $\Lambda_0$, and one for "one" bits, with period $\Lambda_1$. Since it is inconvenient to use two electrooptic periods, we will continue to encode a "zero" using an off (no voltage applied) segment, and a "one" using an on segment. Denote the slant of the electrooptic grating fingers by $\psi$, as in FIG. 9, and define $$\theta_0 = \sin^{-1}(\lambda_o/2n_{eff}\Lambda) \qquad (6)$$

$\theta_0$ is the Bragg angle for the electrooptic segments, measured relative to the electrode fingers. Because zero is encoded by the absence of an electrooptic grating (no applied voltage), it is necessary for an on segment, i.e., a "one", to respond to both SAW codes. We accomplish this by arranging the gratings so that light diffracted from the SAW impinges on the electrooptic grating segments at either of two Bragg angles, one on each side of the grating and at an angle of $\theta_0$ thereto. The four possible situations are illustrated in FIG. 9, lines (a)–(d). In (a) and (b), the SAW code is a zero while in (c) and (d), the SAW code is a one. The required angular relations and the corresponding state of the electrooptic grating segments are summarized in FIG. 9. Note that the light that encounters a "0-0" or a "1-1" situation emerges in a single direction, $\psi-\theta_0$ similarly, "0-1" and "1-0" situations send light in another single direction, $\psi+\theta_0$. If $\psi$ is carefully chosen, stray light from the incident beam will not contaminate either of the output beams.

While the forms of the invention herein disclosed constitute presently preferred embodiments, many others are possible. It is not intended herein to mention all of the possible equivalent forms or ramifications of the invention. It is to be understood that the terms used

REFERENCES

1. R. Shubert and J. H. Harris, IEEE Trans. Microwave Theo. and Tech. MTT-16, 1048–54 (1968).
2. Willie W. Ng, Chi-Shain Hong, and Ammon Yariv, IEEE Trans. Elec. Devices, ED-25, 1193–2000 (1978).
3. C. M. Verber, Van E. Wood, R. P. Kenan and N. F. Hartman, Ferroelectrics 10, 253–256 (1976). U.S. Pat. No. 4,006,967.
4. Hideo Kotani, Susumu Namba and Mitsuo Kawabe, IEEE J. Quant. Elec. QE-15, 270–272 (1979).
5. I. P. Kaminow and L. W. Stulz, IEEE J. Quant. Elec. QE-11, 633–635, (1975).
6. J. M. Hammer, D. J. Channin and M. T. Duffy, Appl. Phys. Lett. 23, 176, 177 (1973).
7. Helge Engan, IEEE Trans. on Electron Devices ED-16, 1014–1017 (1969).
8. Herwig Kogelnik, Bell Syst. Tech. Jour. 48, 2909–2947 (1969).
9. J. M. Hammer and W. Phillips, Appl. Phys. Lett. 24, 545–547 (1974).
10. C. M. Verber, R. P. Kenan, and J. R. Busch, Opt. Comm. 34, 32–34 (1980).

We claim:

1. Apparatus for receiving light entering therein and controlling the directions in which portions of the light travel therethrough, comprising
    input means for directing portions of the entering light in a predetermined input direction into a processing region in a waveguide,
    control means for temporarily and separately changing the index of refraction in each of a plurality of subregions in the processing region by providing an electrical field in each subregion at selected times between a plurality of individually addressable interdigital electrodes therein, to modulate the light travelling thereto in approximately the predetermined input direction differently from any light travelling thereto in other input directions,
    successive subregions being in close proximity and all of the digits in all of the electrodes therein being parallel, alternate digits throughout the processing region being connected together to form one common electrode shared by all subregions, the other digits in each subregion being connected together to form another electrode for that subregion only, and being insulated from all other electrodes, and
    output means for receiving portions of the light travelling beyond the subregions in at least one selected output direction and for responding thereto.

2. Apparatus as in claim 1, wherein the control means comprises an electrooptic grating in each subregion and means for applying a potential difference to each grating separately.

3. Apparatus as in claim 1, wherein the input means comprises means for directing portions of the entering light to the processing region in directions related to their respective directions of entry into the apparatus.

4. Apparatus as in claim 1, wherein each subregion is such that providing altered indexes of refraction therein can form in the subregion a Bragg grating positioned with a direction of Bragg incidence approximately in the predetermined input direction.

5. Apparatus as in claim 4, wherein a selected output direction is approximately twice the Bragg angle away from the predetermined input direction.

6. Apparatus as in claim 4, wherein a selected output direction is approximately the same as the predetermined input direction.

7. Apparatus as in claim 4, wherein a first selected output direction is approximately twice the Bragg angle away from the predetermined input direction and a second selected output direction is approximately the same as the predetermined input direction.

8. Apparatus as in claim 7, wherein the output means comprises means for selectively either permitting light travelling in a selected output direction to continue in approximately the same direction or causing it to travel further in the other selected output direction.

9. Apparatus as in claim 8, wherein the output responsive means comprises output control means for providing selectively and separately in each of a plurality of output responsive subregions; each receiving light travelling from each subregion, respectively, of the processing region; a change in the index of refraction, to modulate the light travelling thereto in approximately the first selected output direction in a first manner, and to modulate the light travelling thereto in approximately the second selected output direction in a second manner.

10. Apparatus as in claim 9, wherein the output control means comprises a surface acoustic wave transducer and means for providing alternating electrical energy to the transducer.

11. Apparatus as in claim 9, wherein the output control means comprises a plurality of electrooptic gratings and means for applying a potential difference to each grating separately.

12. Apparatus as in claim 9, wherein each output responsive subregion is such that providing altered indexes of refraction therein can form in the subregion a Bragg grating positioned with a first direction of Bragg incidence approximately in the first selected output direction and with a second direction of Bragg incidence approximately in the second selected output direction.

13. Apparatus as in claim 12, wherein the output control means comprises means for providing an electric field in each output responsive subregion at selected times.

14. Apparatus as in claim 9, wherein the processing subregion control means comprises means responsive to an ordered first set of separate electrical signals, the output subregion control means comprises means responsive to an ordered second set of separate electrical signals, and the output responsive means comprises also means responsive to light travelling beyond the output responsive subregions to provide an output signal that is responsive to the degree of similarity between the first and second sets of electrical signals.

15. Apparatus as in claim 14, wherein the output responsive means comprises means for providing a discerible indication when the first and second sets of electrical signals are identical in all relevant properties.

16. Apparatus as in claim 15, wherein the electrical signals are provided responsive to digital information and the discernible indication is provided by the output responsive means when the digital information represented by the first set of electrical signals is identical to the digital information represented by the second set of electrical signals.

17. Apparatus as in claim 1, wherein
    the input means comprises means for directing light of known or controlled intensity approximately in the predetermined input direction into the processing region,
    the control means comprises means for applying a separate potential difference to the electrodes of each subregion, and the output means comprises means responsive to light travelling beyond each subregion in at least one selected output direction for providing a separate indication substantially simultaneously with the indications for the other subregions.

18. Apparatus as in claim 17, wherein the control means comprises means responsive to digital information, and the output means comprises means for providing selectively either a first indication or a second indication in each of a plurality of indicators.

19. Apparatus as in claim 18, wherein each indicator comprises a separate area in a tangible medium, the first indication comprises a first condition provided in an area by the output means, and the second indication comprises a second condition either provided by the output means or comprising a preexisting condition permitted to continue by the absence of any action on the area by the output means.

20. Apparatus as in claim 19, wherein the output means, selectively for each separate area, either provides a predetermined mark therein or permits the area to remain free of such a mark.

21. Apparatus as in claim 19, wherein the output means, selectively for each separate area, either changes a chemical, electrical, or magnetic property therein or permits the property to remain in a preexisting state.

22. Apparatus as in claim 19, wherein the output means, selectively for each separate area, either substantially removes an existing electrical charge therein or permits the charge to remain substantially undiminished.

23. Apparatus as in claim 17, wherein the control means comprises means responsive to analog information, and the output means comprises means for providing selectively, in each of a plurality of indicators, an indication responsive to a quantity that is a function of the analog information.

24. Apparatus as in claim 23, wherein each indicator comprises a separate area in a tangible medium, and the output means affects a condition therein.

25. Apparatus as in claim 24, wherein the output means, selectively for each separate area, determines the magnitude of a condition therein.

26. Apparatus as in claim 24, wherein the output means, selectively for each separate area, provides a controlled value of a light responsive property therein.

27. Apparatus as in claim 26, wherein the output means determines the visible shade of each area.

28. Apparatus as in claim 26, wherein the output means determines the magnitude of a chemical, electrical, or magnetic property in each area.

29. Apparatus as in claim 26, wherein the output means determines the polarity and magnitude of any electrical charge in each area.

30. Apparatus as in claim 1, wherein the input means comprises means for controlling separately at a predetermined or detectable instant the input direction in which a major portion of the entering light is travelling when it reaches each subregion.

31. Apparatus as in claim 30, wherein the input direction controlling means comprises means for directing a major portion of the entering light selectively either in the predetermined input direction or in a different input direction.

32. Apparatus as in claim 30, wherein the input direction controlling means comprises means for directing portions of the light entering the apparatus in a predetermined direction, selectively, in an input direction that is either the same as the entering direction or a different direction, one of the selectable directions being the predetermined input direction.

33. Apparatus as in claim 32, wherein the input direction controlling means comprises a surface acoustic wave transducer and means for providing alternating electrical energy to the transducer.

34. Apparatus as in claim 32, wherein the input direction controlling means comprises a plurality of electrooptic gratings and means for applying a potential difference to each grating separately.

35. Apparatus as in claim 30, wherein the input direction controlling means comprises means responsive to an ordered first set of separate electrical signals, the subregion control means comprises means responsive to an ordered second set of separate electrical signals, and the output responsive means comprises means responsive to an output signal that is responsive to the degree of similarity between the first and second sets of electrical signals.

36. Apparatus as in claim 35, wherein the output responsive means comprises means for providing a discernible indication when the first and second sets of electrical signals are identical in all relevant properties.

37. Apparatus as in claim 36, wherein the electrical signals are provided responsive to digital information and the discernible indication is provided by the output responsive means when the digital information represented by the first set of electrical signals is identical to the digital information represented by the second set of electrical signals.

38. Apparatus as in claim 30, wherein the control means is separately responsive to light in first and second predetermined input directions, and to other input directions.

39. Apparatus as in claim 38, wherein the input direction controlling means comprises means for directing a major portion of the entering light selectively either in the first predetermined input direction, in the second predetermined input direction, or in a different input direction.

40. Apparatus as in claim 39, wherein the input direction controlling means comprises first and second surface acoustic wave transducers and means for providing alternating electrical energy to each transducer in response to binary information, where a binary "zero" causes the energy to be directed to the first transducer and a binary "one" causes the energy to be directed to the second transducer.

41. Apparatus as in claim 39, wherein the first and second input directions and the subregions are so arranged that when a Bragg grating is formed in a subregion it has a first direction of Bragg incidence approximately in the first input direction and a second direction of Bragg incidence in the second input direction.

42. Apparatus as in claim 41, wherein the first and second predetermined input directions and the output directions from the Bragg grating formed in each subregion are all different from the direction in which light enters the apparatus.

43. Apparatus for receiving light entering therein and controlling the directions in which portions of the light travel therethrough, comprising
    input means for directing portions of the entering light in a predetermined input direction into a processing region in a waveguide,
    control means for temporarily and separately changing the index of refraction in each of a plurality of subregions in the processing region, to modulate the light travelling thereto in approximately the predetermined input direction differently from any light travelling thereto in other input directions, and output means for receiving portions of the light travelling beyond the subregions in at least one selected output direction and for responding thereto, the input means comprising means for controlling separately at a predetermined or detectable instant the input direction in which a major portion of the entering light is travelling when it reaches each subregion, and the control means being separately responsive to light in first and second predetermined input directions, and to other input directions.

44. Apparatus as in claim 43, wherein the input direction controlling means comprises means for directing a major portion of the entering light selectively either in the first predetermined input direction, in the second predetermined input direction, or in a different input direction.

45. Apparatus as in claim 44, wherein the input direction controlling means comprises first and second surface acoustic wave transducers and means for providing alternating electrical energy to each transducer in response to binary information, where a binary "zero" causes the energy to be directed to the first transducer and a binary "one" causes the energy to be directed to the second transducer.

46. Apparatus as in claim 44, wherein the first and second input directions and the subregions are so arranged that when a Bragg grating is formed in a subregion it has a first direction of Bragg incidence approximately in the first input direction and a second direction of Bragg incidence in the second input direction.

47. Apparatus as in claim 46, wherein the first and second predetermined input directions and the output directions from the Bragg grating formed in each subregion are all different from the direction in which light enters the apparatus.

48. Apparatus for receiving light entering therein and controlling the directions in which portions of the light travel therethrough, comprising input means for directing portions of the entering light in a predetermined input direction into a processing region in a waveguide, control means for temporarily and separately changing the index of refraction in each of a plurality of subregions in the processing region, to modulate the light travelling thereto in approximately the predetermined input direction differently from any light travelling thereto in other input directions, each subregion being such that providing altered indexes of refraction therein can form in the subregion a Bragg grating positioned with a direction of Bragg incidence approximately in the predetermined input direction, and output means for receiving portions of the light travelling beyond the subregions in at least one selected output direction and for responding thereto, a first selected output direction being approximately twice the Bragg angle away from the predetermined input direction and a second selected output direction being approximately the same as the predetermined input direction, the output means comprising means for selectively either permitting light travelling in a selected output direction to continue in approximately the same direction or causing it to travel further in the other selected output direction, the output responsive means comprising output control means for providing selectively and separately in each of a plurality of output responsive subregions; each receiving light travelling from each subregion, respectively, of the processing region; a change in the index of refraction, to modulate the light travelling thereto in approximately the first selected output direction in a first manner, and to modulate the light travelling thereto in approximately the second selected output direction in a second manner, the processing subregion control means comprising means responsive to an ordered first set of separate electrical signals, the output subregion control means comprising means responsive to an ordered second set of separate electrical signals, and the output responsive means comprising also means responsive to light travelling beyond the output responsive subregions to provide an output signal that is responsive to the degree of similarity between the first and second sets of electrical signals.

49. Apparatus as in claim 48, wherein the output responsive means comprises means for providing a discernible indication when the first and second sets of electrical signals are identical in all relevant properties.

50. Apparatus as in claim 49, wherein the electrical signals are provided responsive to digital information and the discernible indication is provided by the output responsive means when the digital information represented by the first set of electrical signals is identical to the digital information represented by the second set of electrical signals.

51. Apparatus for receiving light entering therein and controlling the directions in which portions of the light travel therethrough, comprising input means for directing portions of the entering light in a predetermined input direction into a processing region in a waveguide, control means for temporarily and separately changing the index of refraction in each of a plurality of subregions in the processing region, to modulate the light travelling thereto in approximately the predetermined input direction differently from any light travelling thereto in other input directions, and output means for receiving portions of the light travelling beyond the subregions in at least one selected output direction and for responding thereto, the input means comprising means for controlling separately at a predetermined or detectable instant the input direction in which a major portion of the entering light is travelling when it reaches each subregion, and the input direction controlling means comprising means responsive to an ordered first set of separate electrical signals, the subregion control means comprising means responsive to an ordered second set of separate electrical signals, and the output responsive means comprising means responsive to an output signal that is responsive to the degree of similarity between the first and second sets of electrical signals.

52. Apparatus as in claim 51, wherein the output responsive means comprises means for providing a discernible indication when the first and second sets of electrical signals are identical in all relevant properties.

53. Apparatus as in claim 52, wherein the electrical signals are provided responsive to digital information and the discernible indication is provided by the output responsive means when the digital information represented by the first set of electrical signals is identical to the digital information represented by the second set of electrical signals.

54. Apparatus for receiving light entering therein and controlling the directions in which portions of the light travel therethrough, comprising
  input means for directing portions of the entering light of known or controlled intensity approximately in a predetermined input direction into a processing region in a waveguide,
  control means responsive to digital information for temporarily and separately changing the index of refraction in each of a plurality of subregions in the processing region, by applying a separate potential difference to electrodes in each subregion, to modulate the light travelling thereto in approximately the predetermined input direction differently from any light travelling thereto in other input directions, and
  output means responsive to light travelling beyond each subregion in at least one selected output direction for providing selectively either a first indication or a second indication in each of a plurality of indicators, separately and substantially simultaneously with the indications for the other subregions, each indicator comprising a separate area in a tangible medium, the first indication comprising a first condition provided in an area by the output means, and the second indication comprising a second condition either provided by the output means or comprising a preexisting condition permitted to continue by the absence of any action on the area by the output means,
  the output means, selectively for each separate area, (A) either providing a predetermined mark therein or permitting the area to remain free of such a mark, or (B) either changing a chemical, electrical, or magnetic property therein or permitting the property to remain in a preexisting state, or (C) either substantially removing an existing electrical charge therein or permitting the charge to remain substantially undiminished.

55. Apparatus for receiving light entering therein and controlling the directions in which portions of the light travel therethrough, comprising
  input means for directing portions of the entering light of known or controlled intensity approximately in a predetermined input direction into a processing region in a waveguide,
  control means responsive to analog information for temporarily and separately changing the index of refraction in each of a plurality of subregions in the processing region, by applying a separate potential difference to electrodes in each subregion, to modulate the light travelling thereto in approximately the predetermined input direction differently from any light travelling thereto in other input directions, and
  output means responsive to light travelling beyond each subregion in at least one selected output direction for providing selectively, in each of a plurality of indicators, an indication responsive to a quantity that is a function of the analog information, separately and substantially simultaneously with the indications for the other subregions, each indicator comprising a separate area in a tangible meduim, and the output means, selectively for each separate area, determining the visible shade of the area.

56. Apparatus for receiving light entering therein and controlling the directions in which portions of the light travel therethrough, comprising
  input means for directing portions of the entering light in a predetermined input direction into a processing region in a waveguide,
  control means for temporarily and separately changing the index of refraction in each of a plurality of subregions in the processing region, to modulate the light travelling thereto in approximately the predetermined input direction differently from any light travelling thereto in other input directions, each subregion being such that providing altered indexes of refraction therein can form in the subregion a Bragg grating positioned with a direction of Bragg incidence approximately in the predetermined input direction, and
  output means for receiving portions of the light travelling beyond the subregions in at least one selected output direction and for responding thereto,
  a first selected output direction being approximately twice the Bragg angle away from the predetermined input direction and a second selected output direction being approximately the same as the predetermined input direction,
  the output means comprising means for selectively either permitting light travelling in a selected output direction to continue in approximately the same direction or causing it to travel further in the other selected output direction,
  the output responsive means comprising output control means for providing selectively and separately in each of a plurality of output responsive subregions; each receiving light travelling from each subregion, respectively, of the processing region; a change in the index of refraction, to modulate the light travelling thereto in approximately the first selected output direction in a first manner, and to modulate the light travelling thereto in approximately the second selected output direction in a second manner,
  each output responsive subregion being such that providing altered indexes of refraction therein can form in the subregion a Bragg grating positioned with a first direction of Bragg incidence approximately in the first selected output direction and with a second direction of Bragg incidence approximately in the second selected output direction, and
  the output control means comprising means for providing an electric field in each output responsive subregion at selected times.

57. Apparatus for receiving light entering therein and controlling the directions in which portions of the light travel therethrough, comprising
  input means for directing portions of the entering light in a predetermined input direction into a processing region in a waveguide,
  control means for temporarily and separately changing the index of refraction in each of a plurality of subregions in the processing region, to modulate the light travelling thereto in approximately the predetermined input direction differently from any light travelling thereto in other input directions, each subregion being such that providing altered indexes of refraction therein can form in the subregion a Bragg grating positioned with a direction of Bragg incidence approximately in the predetermined input direction, and output means for receiving portions of the light travelling beyond the subregions in at least one selected output direction and for responding thereto, a first selected output direction being approximately twice the Bragg angle away from the predetermined input direction and a second selected output direction being approximately the same as the predetermined input direction, the output means comprising means for selectively either permitting light travelling in a selected output direction to continue in approximately the same direction or causing it to travel further in the other selected output direction, the output responsive means comprising output control means for providing selectively and separately in each of a plurality of output responsive subregions; and receiving light travelling from each subregion, respectively, of the processing region; a change in the index of refraction, to modulate the light travelling thereto in approximately the first selected output direction in a first manner, and to modulate the light travelling thereto in approximately the second selected output direction in a second manner, and the output control means comprising a plurality of electrooptic gratings and means for applying a potential difference to each grating separately.

58. Apparatus for receiving light entering therein and controlling the directions in which portions of the light travel therethrough, comprising input means for directing portions of the entering light in a predetermined input direction into a processing region in a waveguide, control means for temporarily and separately changing the index of refraction in each of a plurality of subregions in the processing region, to modulate the light travelling thereto in approximately the predetermined input direction differently from any light travelling thereto in other input directions, and output means for receiving portions of the light travelling beyond the subregions in at least one selected output direction and for responding thereto, the input means comprising means for controlling separately at a predetermined or detectable instant the input direction in which a major portion of the entering light is travelling when it reaches each subregion, the input direction controlling means comprising means for directing portions of the light entering the apparatus in a predetermined direction, selectively, in an input direction that is either the same as the entering direction or a different direction, one of the selectable directions being the predetermined input direction, and the input direction controlling means comprises a surface acoustic wave transducer and means for providing alternating electrical energy to the transducer.

* * * * *